United States Patent
Gan et al.

(10) Patent No.: US 9,350,508 B2
(45) Date of Patent: May 24, 2016

(54) METHOD AND ARRANGEMENT IN A WIRELESS COMMUNICATION NETWORK

(75) Inventors: Jiansong Gan, Beijing (CN); Christian Hoymann, Aachen (DE); Yin Liu, Beijing (CN); Hai Wang, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 691 days.

(21) Appl. No.: 13/521,454

(22) PCT Filed: Jan. 18, 2010

(86) PCT No.: PCT/CN2010/000074
§ 371 (c)(1),
(2), (4) Date: Aug. 8, 2012

(87) PCT Pub. No.: WO2011/085522
PCT Pub. Date: Jul. 21, 2011

(65) Prior Publication Data
US 2013/0058264 A1    Mar. 7, 2013

(51) Int. Cl.
*H04L 5/00* (2006.01)
*H04B 7/155* (2006.01)
*H04L 5/14* (2006.01)
*H04W 56/00* (2009.01)
*H04W 84/04* (2009.01)
*H04W 72/00* (2009.01)

(52) U.S. Cl.
CPC .............. *H04L 5/0053* (2013.01); *H04B 7/155* (2013.01); *H04L 5/14* (2013.01); *H04W 56/003* (2013.01); *H04W 72/00* (2013.01); *H04W 84/047* (2013.01)

(58) Field of Classification Search
CPC ...... H04L 5/0053; H04L 5/001; H04L 1/1861; H04L 5/0007; H04W 72/042
See application file for complete search history.

(56) References Cited

U.S. PATENT DOCUMENTS

| 2011/0305134 A1* | 12/2011 | Chung et al. .................. 370/216 |
| 2011/0310778 A1* | 12/2011 | Seo et al. ....................... 370/280 |
| 2012/0033588 A1* | 2/2012 | Chung et al. .................. 370/280 |

FOREIGN PATENT DOCUMENTS

| CN | 1909533 A | 2/2007 |
| CN | 1 014 73555 A | 7/2009 |
| CN | 101594205 A | 12/2009 |

* cited by examiner

*Primary Examiner* — Jung Park
(74) *Attorney, Agent, or Firm* — Murphy, Bilak & Homiller, PLLC

(57) ABSTRACT

Method and arrangement in a base station for sending control signals to a relay node. The relay node is configured to relay a data transmission from the base station to a user equipment in a subframe. The subframe comprises a first part, dedicated for downlink transmission, a second part dedicated for uplink transmission and a separating part situated between the first part and the second part. The base station, the relay node and the user equipment are comprised in a wireless communication network configured to operate according to the Time Division Duplex TDD principle. The method comprising transmitting data to the user equipment via the relay node in the first part of the subframe and transmitting the control signals, related to the transmitted data, to the relay node in the separating part between the first part and the second part of the subframe. Further, a method and arrangement in a relay node for receiving control signals from the base station are described.

14 Claims, 11 Drawing Sheets

METHOD AND ARRANGEMENT IN A WIRELESS COMMUNICATION NETWORK

TECHNICAL FIELD

The present invention relates to a method and arrangement in a wireless communication network and, more in particular, to a mechanism for control signalling within a wireless communication network.

BACKGROUND

Relaying is being considered for Long Term Evolution (LTE) Rel-10 as a tool to improve the coverage of high data rates, group mobility, temporary network deployment, the cell-edge throughput and/or to provide coverage in new areas. At least type 1 relay nodes are part of LTE-Advanced, and a type 1 relay is an inband relaying node (RN).

To avoid self interference at relay, and at the same time maintain backward compatibility to Release 8 (Rel-8) user equipment units (UEs), Multicast Broadcast Single Frequency Network (MBSFN) subframes configured for the relay-to-UE link are used to create transmission gaps for eNB-to-relay transmissions, as illustrated in FIG. 1. In the illustrated example relay-to-UE communication using normal subframes and eNodeB-to-relay communication using MBSFN subframes If time-aligned subframes are used for evolved NodeB (eNB) and relay transmissions, the relay can not receive the Rel-8 control signalling from its eNB during the first 1 or 2 Orthogonal Frequency-Division Multiplexing (OFDM) symbols as the relay has to transmit the Physical Downlink Control Channel (PDCCH) to user equipment units in the relay cell at the same time. To solve this problem, in Third Generation Partnership Project (3GPP) it has been discussed the use of a new control channel structure, i.e. the Relay-Physical Downlink Control Channel (R-PDCCH), for the backhaul link between the donor cell and the relay node. The R-PDCCH is transmitted outside the control region in the donor cell using a semi-statically configured set of Resource Blocks (RBs) as illustrated in FIG. 2.

A time-shifting approach was also proposed to enable the relay to receive control signalling from its donor eNB. The basic idea of time shifting is to use non-time-aligned subframes for eNB and relay transmissions so that the Rel-8 control channel structures can be reused as much as possible. By doing this, relay can receive control signalling in relay-to-UE transmission gap. Time shifting is illustrated for Time Division Duplex (TDD) in FIG. 3.

Defining a dedicated R-PDCCH, and possibly also related channels such as Relay Physical Hybrid Automatic Repeat reQuest (HARQ) Indicator Channel (R-PHICH) and Relay Physical Control Format Indicator Channel (R-PCFICH) requires a substantial design effort, revisiting many of the lengthy discussions and decisions taken during the Rel-8 design. The control channel design might also impact other areas such as reference signals.

Time shifting could be a solution to reuse LTE Rel-8 design and thus to simplify the overall standardization and implementation effort. However there are some disadvantages for such a scheme As the frames of eNB and relay are not time-aligned, some LTE Rel-10 features e.g. CoMP and MBSFN schemes between eNB and relay can not be used.

As the last few OFDM symbols in a subframe can not be received (some form of overhead), which can be regarded as overhead, the transmission efficiency is reduced.

In TDD systems, RN undergoes more severe Tx-Rx switching loss than in FDD systems. As increased downlink-uplink switch time such as i.e. few OFDM symbols is needed, the downlink-uplink switch time will be reduced for a given special subframe configuration, which leads to reduced coverage. Larger guard periods may be utilized, which however leads to additional overhead.

SUMMARY

It is an object of the present invention to obviate at least some of the above mentioned disadvantages and to provide a mechanism for improving the performance within a wireless communication network.

According to a first aspect, the object is achieved by a method in a base station for sending control signals to a relay node. The method tries to use the guard period in the special subframe for base station to transmit control signals to a relay. The relay node is configured to relay a data transmission from the base station to a user. The special subframe comprises a first part, dedicated for downlink transmission, a second part dedicated for uplink transmission and a separating part situated between the first part and the second part. The base station, the relay node and the user equipment are comprised in a wireless communication network configured to operate according to the Time Division Duplex TDD principle. The method comprises transmitting data to the user equipment via the relay node in the first part of the subframe and transmitting the control signals, related to the transmitted data, to the relay node in the separating part between the first part and the second part of the subframe.

According to a second aspect, the object is also achieved by an arrangement in a base station for sending control signals to a relay node. The relay node is configured to relay a data transmission from the base station to a user equipment in a subframe. The subframe comprises a first part, dedicated for downlink transmission, a second part dedicated for uplink transmission and a separating part situated between the first part and the second part. The base station, the relay node and the user equipment are comprised in a wireless communication network configured to operate according to the Time Division Duplex TDD principle. The method comprises transmitting data to the user equipment via the relay node in the first part of the subframe and transmitting the control signals, related to the transmitted data, to the relay node in the separating part between the first part and the second part of the subframe.

According to a third aspect, the object is also achieved by a method in a relay node for receiving control signals from a base station. The relay node is configured to relay a data transmission from the base station to a user equipment in a subframe. The subframe comprises a first part, dedicated for downlink transmission, a second part dedicated for uplink transmission and a separating part situated between the first part and the second part. The base station, the relay node and the user equipment are comprised in a wireless communication network configured to operate according to the Time Division Duplex TDD principle. The method comprises receiving data from the base station, to be transmitted to the user equipment in the first part of the subframe and receiving control signals, related to the received data, from the base station in the separating part between the first part and the second part of the subframe.

According to a fourth aspect, the object is also achieved by an arrangement in a relay node for receiving control signals from a base station. The relay node is configured to relay a data transmission from the base station to a user equipment in a subframe. The subframe comprises a first part, dedicated for downlink transmission, a second part dedicated for uplink transmission and a separating part situated between the first part and the second part. The base station, the relay node and the user equipment are comprised in a wireless communication network configured to operate according to the Time Division Duplex TDD principle. The arrangement is configured to receive data from the base station, to be transmitted to the user equipment in the first part of the subframe and configured to receive control signals, related to the received data, from the base station in the separating part between the first part and the second part of the subframe.

Compared with the existing solutions, the proposed solution has the following advantages. It outperforms R-PDCCH solution in standardization and implementation efforts. Also, it outperforms time-shifting approach in less overhead, less coverage impact and CoMP and MBSFN supportability. Furthermore, no impact on Physical Downlink Shared Channel (PDSCH) transmission and reception is made. The present method and arrangement may also be used as a pre-standard proprietary solution for early product. Further, reusing the Rel-8 design as much as possible would, from this perspective, significantly simplify the overall standardization and implementation effort. Thus an improved performance within a wireless communication network is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The present solution is defined as a method and an arrangement in a base station and a method and an arrangement in a relay node, which may be put into practice in the embodiments described below. The present solution may, however, be embodied in many different forms and should not be construed as limited to the embodiments set forth herein; rather, these embodiments are provided so that this disclosure will be thorough and complete, and will fully convey the scope of the present solution. It should be understood that there is no intent to limit the present methods, and arrangements to any of the particular forms disclosed, but on the contrary, the present methods, computer program products and arrangements are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 1:
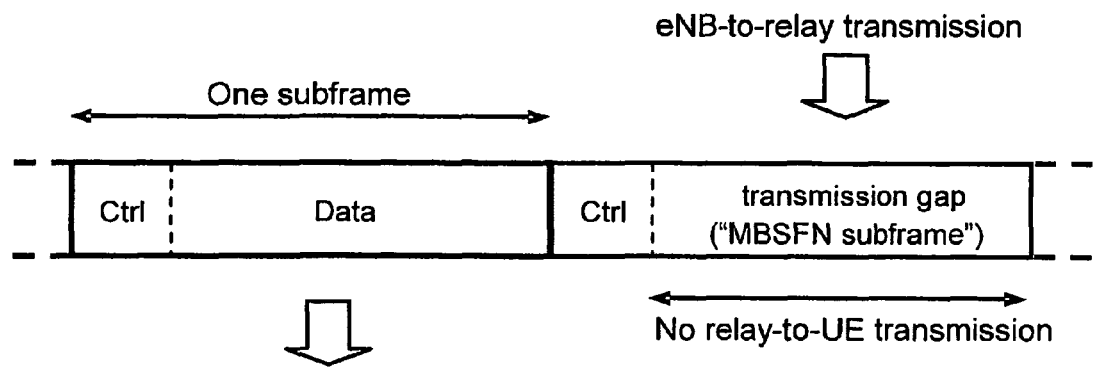
FIG. 1 is a schematic block diagram illustrating an example of relay to UE communication using normal subframes and eNB to relay communication using MBSFN subframes, according to prior art.
Figure 2:
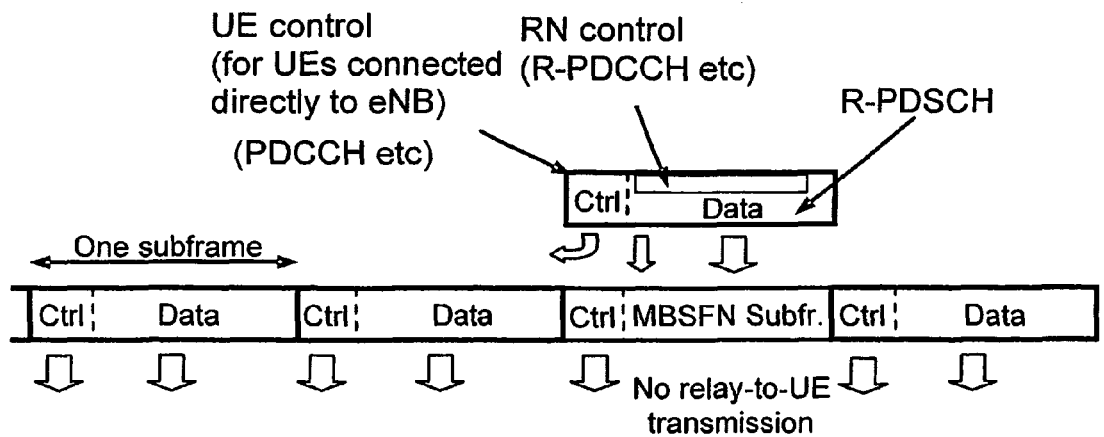
FIG. 2 is a block diagram illustrating an example of PDCCH and R-PDCCH, according to prior art.
Figure 3:
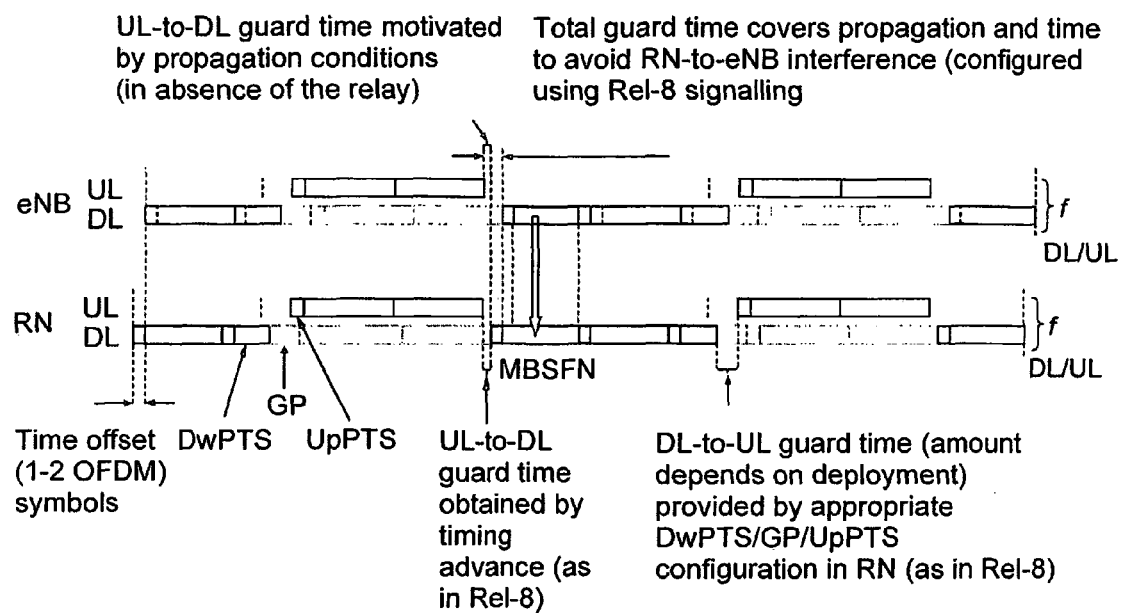
FIG. 3 is a schematic block diagram illustrating time offset between eNB and RN cells for TDD, according to prior art.
Figure 4:
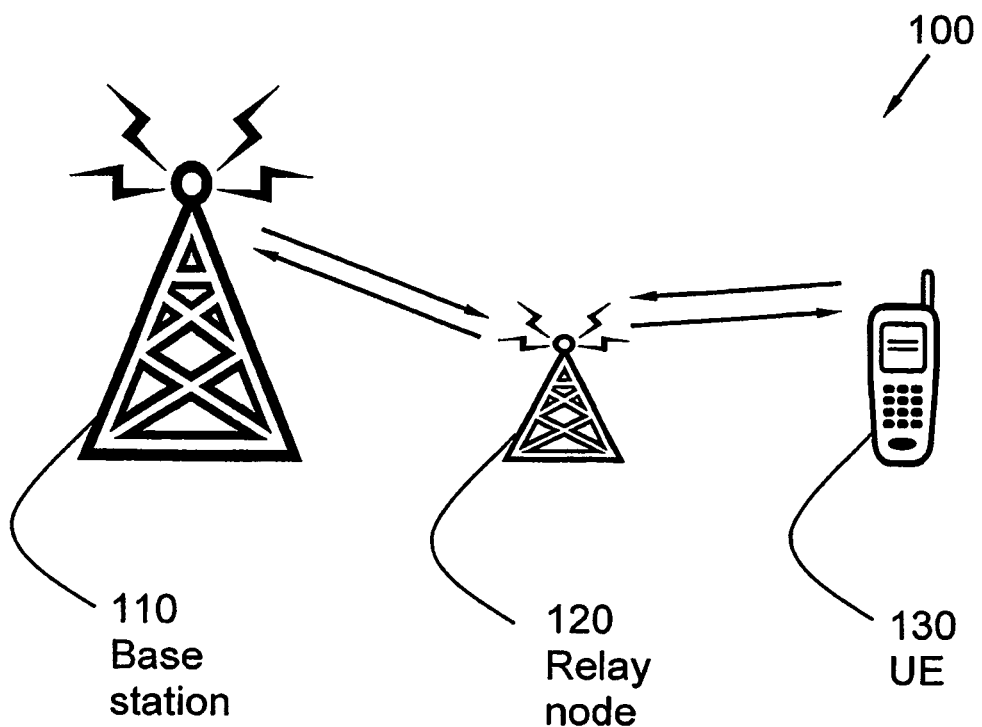
FIG. 4 is a schematic block diagram illustrating a wireless communication network.

FIG. 4 is a schematic illustration over a wireless communication network 100. The wireless communication network 100 comprises at least one base station 110 and a relay node 120. The wireless communication network 100 is further configured to comprise a plurality of user equipment units 130. The base station 110 may send and receive wireless signals to and from the user equipment 130 via the relay node 120.

Although only one base station 110 and one relay node 120 is shown in FIG. 4, it is to be understood that another configuration of base station transceivers and relay nodes, respectively, may be comprised within the wireless communication network 100. Further, the base station 110 may be referred to as e.g. a Remote Radio Unit, an access point, a Node B, an evolved Node B (eNode B or eNB) and/or a base transceiver station, Access Point Base Station, base station router, etc depending e.g. of the radio access technology and terminology used. Also, the terminology donor eNB may be used for the base station 110, in relation to the relay node 120.

The wireless communication network 100 allows transmission/reception of information using a plurality of wireless nodes 120, 130. In general, in the wireless network 100, wireless relay nodes 120 are installed between base stations 110, which are spaced apart from each other beyond each communicable range and which are fixedly installed, or fixed nodes are wire-connected to each other, thereby enabling long distance communication between the fixed nodes installed at locations spaced apart from each other.

The relay node 120 may comprise a radio communication section, an information recording section, and an information conveying section, according to some embodiments. The information conveying section may transmit information between the radio communication section and the information recording section and determine a destination of the information. The relay node 120 may receive information from the base station 110 through the radio communication section, and store the received information in the information recording section through the information conveying section. Then, the relay node 120 may transmit the information stored in the information recording section to the user equipment 130 through the radio communication section.

In some embodiments, the user equipment 130 may be represented by a wireless communication device, a wireless communication terminal, a mobile cellular telephone, a Personal Communications Systems terminal, a mobile station (MS), a Personal Digital Assistant (PDA), a laptop, computer or any other kind of device configured for managing radio resources.

The wireless communication network 100 may be based on technologies such as e.g. LTE, such as e.g. LTE Rel-8, LTE Rel-9, LTE Rel-10 and/or LTE-Advanced, Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), COMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

The wireless communication system 100 is configured to operate according to the Time Division Duplex (TDD) principle.

Further, as used herein, the wireless communication network 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

It is to be noted however, that the present solution is not in any way limited to be performed exclusively over a radio interface within the wireless communication network 100, but may be performed within a wireless communication network 100 where some nodes are wirelessly connected and some nodes have a wired connection.

The user equipment 130 may further communicate with other user equipment units not shown in FIG. 4, via the base station 110 and the relay node 120 comprised within the wireless communication network 100.

The expression "downlink" (DL) is here used to specify the transmission from the base station 110, via the relay node 120 to the user equipment 130, while the expression, "uplink" (UL) is used to denote the transmission from the user equipment 130 to the base station 110, via the relay node 120.

The base station 110 is configured for sending control signals to the relay node 120. The relay node 120 is configured to relay a data transmission from the base station 110 to the user equipment 130 in a special subframe. Such special subframe is illustrated in FIG. 5.

Figure 5:
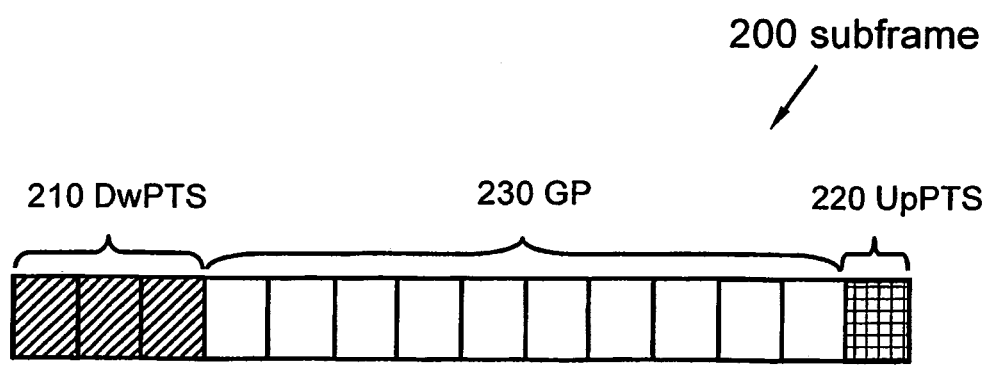
FIG. 5 is a schematic block diagram illustrating an example of a special subframe configuration.

FIG. 5 is a schematic block diagram illustrating an example of a special subframe configuration. The subframe 200 comprises a first part 210 dedicated for downlink transmission, a second part 220 dedicated for uplink transmission and a separating part 230 situated between the first part 210 and the second part 220. The base station 110, the relay node 120 and the user equipment 130 are comprised in a wireless communication network 100. The first part 210 may be a Downlink Pilot Time Slot (DwPTS), according to some embodiments. The second part 220 may be an Uplink Pilot Time Slot (UpPTS). Further, the separating part 230, situated between the first part 210 and the second part 220 may be a Guard Period (GP).

The illustrated subframe 200 thus comprises three parts DwPTS 210, GP 230 and UpPTS 220. The basic idea of the present methods and arrangements is to use the Guard Period part 230 for transmitting control signalling to the relay node 120. The control signalling transmitted in the Guard Period 230 may be referred to as Un-Ctrl in the following context.

The present methods and arrangements utilize the guard period 230 in special subframes 200 to transmit L1/L2 control signalling for backhaul of TDD relays. Such control signalling may be defined to refer to resource in later backhaul subframes. With such a method, LTE Rel-8 control signalling may be reused, and standardization as well as implementation effort can be kept low. The problems relating to a time-shifting approach may also be avoided or relieved.

The present methods and arrangements comprise two main parts: placement of L1/L2 control signalling for backhaul and using Rel-8 L1/L2 signalling to indicate transmission on Un subframes 200, i.e. subframes 200 to be sent between the base station 110 and the relay node 120.

In the wireless communication network 100, the downlink L1/L2 control signalling resides in the first few OFDM symbols (1, 2, 3 or 4) of a subframe. The control signalling comprises a Physical Control Format Indicator Channel (PCFICH), a Physical Hybrid ARQ Indicator Channel (PHICH) and/or a Physical Downlink Control Channel (PDCCH). This control region occupies the entire bandwidth of the system.

In order to reuse the existing control region design of LTE Rel-8 for Un (subframes to be sent between the base station 110 and the relay node 120) transmission, the control signalling for backhaul can also span the entire bandwidth, according to some embodiments. 3GPP R-PDCCH may be transmitted in PDSCH region, if R-PDCCH occupiers the entire bandwidth, user equipment 130 may have some problem to receive PDSCH.

For LTE TDD, guard period 230 is used as downlink-uplink switch to cover the round-trip propagation delay and to control the inter-site interference. Thus the user equipment 130 does not expect anything to be transmitted in the guard period 230. If such area is used for transmitting control signalling to the relay node 120, the entire bandwidth may be used, and hence control signalling such as e.g. LTE Rel-8 control signalling may be reused.

Figure 6:
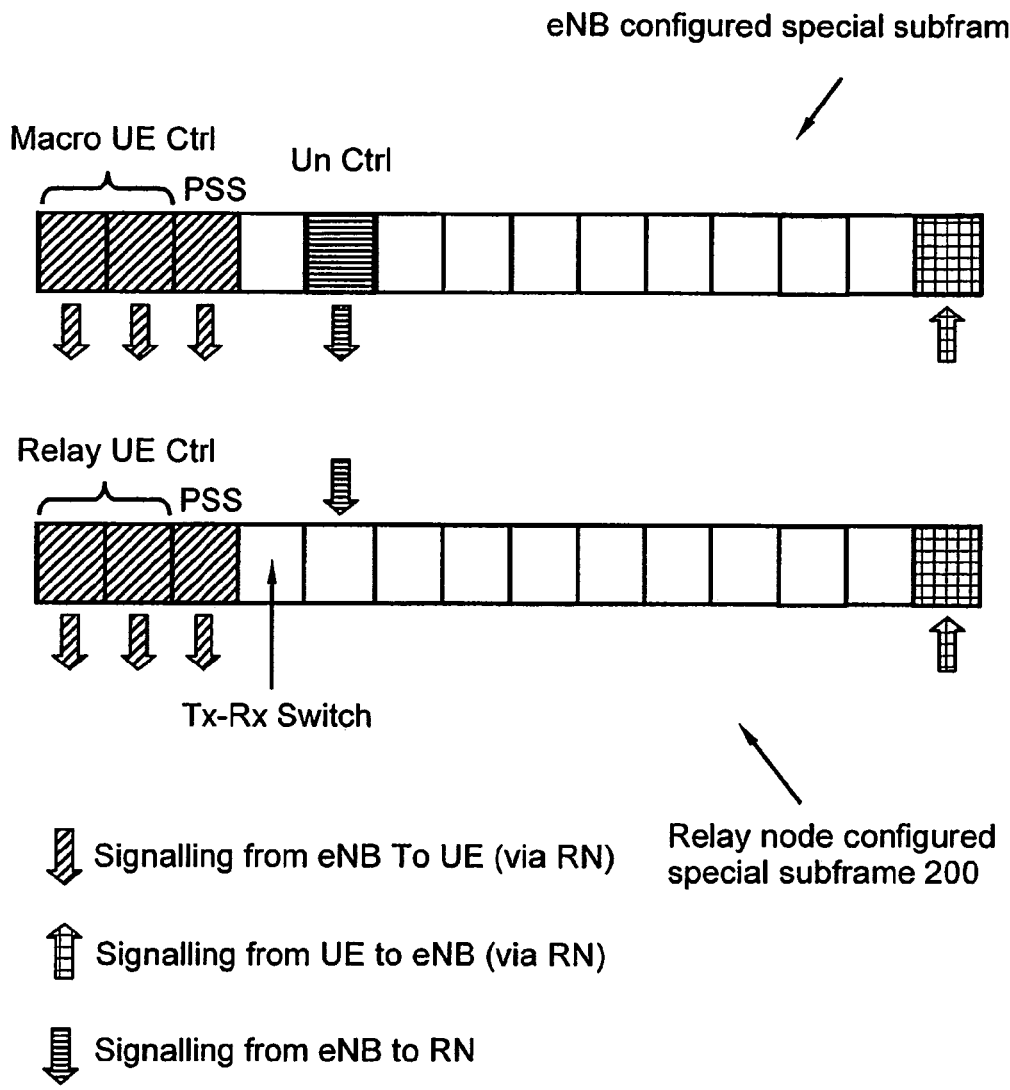
FIG. 6 is a schematic block diagram illustrating control signalling in a guard period of a special subframe, according to some embodiments.

FIG. 6 is a schematic block diagram illustrating control signalling in a guard period 230 of a special subframe 200, according to some embodiments. The same configuration of the special subframe 200 is here utilized both in the base station 110 and the relay node 130, according to some embodiments.

Figure 7:
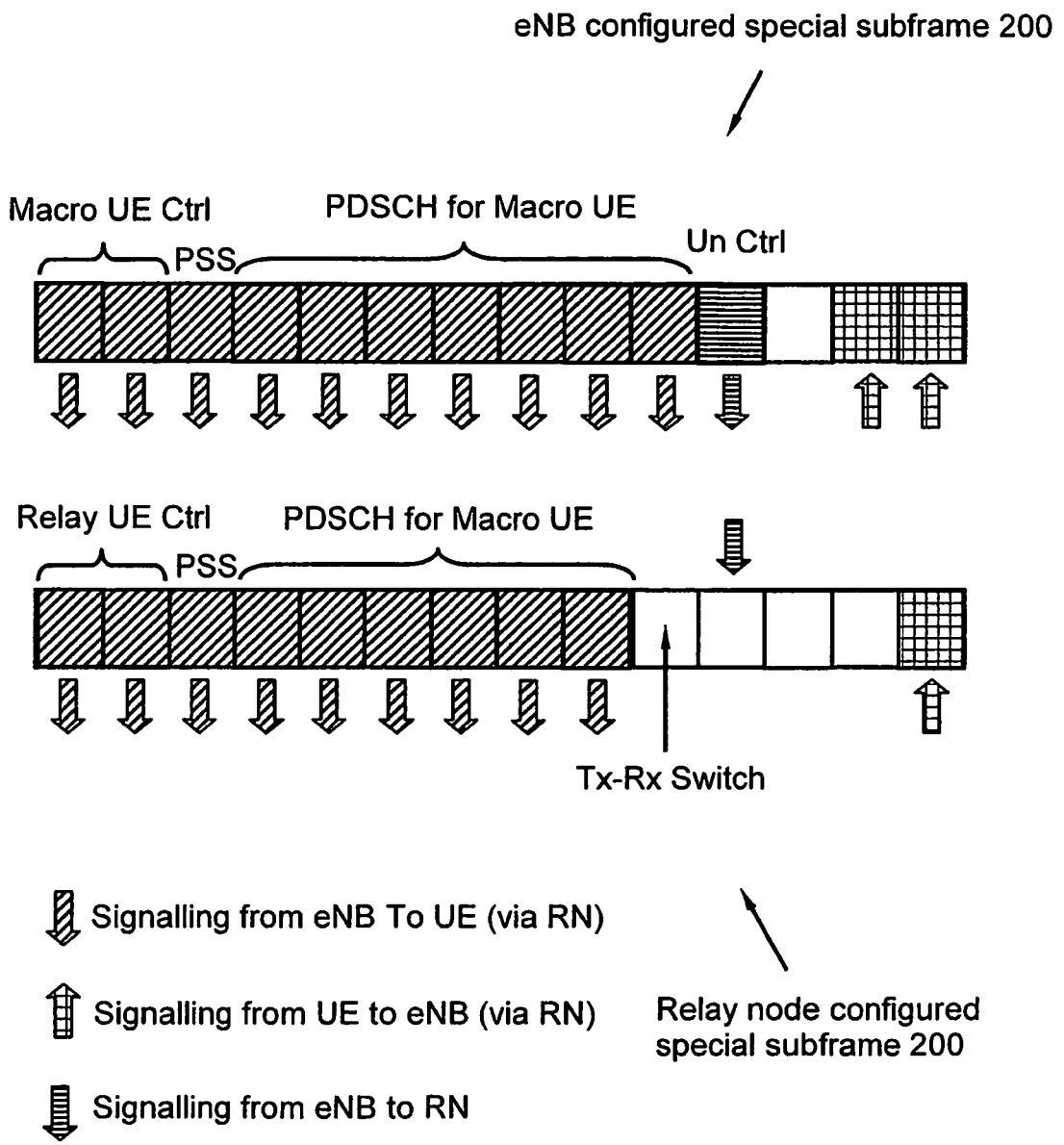
FIG. 7 is a schematic block diagram illustrating control signalling in a guard period of a special subframe, according to some embodiments.

FIG. 7 is a schematic block diagram illustrating control signalling in a guard period 230 of a special subframe 200, according to some embodiments. In the illustrated example, different configuration of the special subframe 200 is utilized in the base station 110 and the relay node 130.

As shown in FIG. 6 and FIG. 7, the relay node 120 and the base station 110 may use the same, or different special subframe configurations. If the same configuration is used, one symbol after DwPTS 210 of the base station 110 i.e. donor eNB, may be left blank in order for the relay node 120 to switch from transmission mode to reception mode. If different subframe configuration is used by the base station 110 and the relay node 120 e.g. in that case the relay node 120 may use a configuration with shorter DwPTS 210 than that of the base station 110, no blank symbol may have to be reserved as the relay node 120 has sufficient time to switch from transmission to reception.

Figure 8:
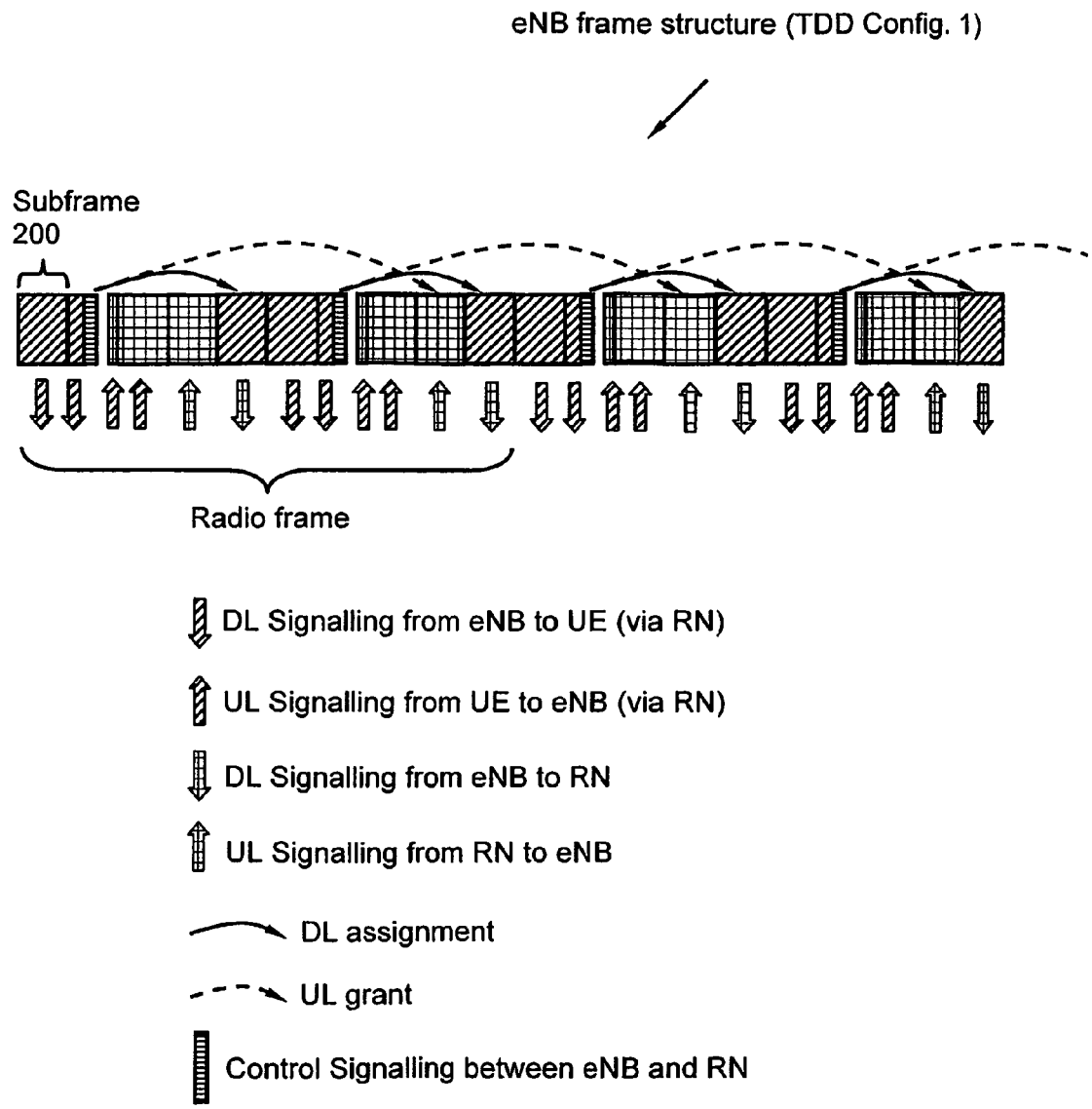
FIG. 8 is a schematic block diagram illustrating downlink assignment and uplink grant, one control to one subframe.

FIG. 8 is a schematic block diagram illustrating downlink assignment and uplink grant, one control to one subframe, according to some embodiments.

Figure 9:
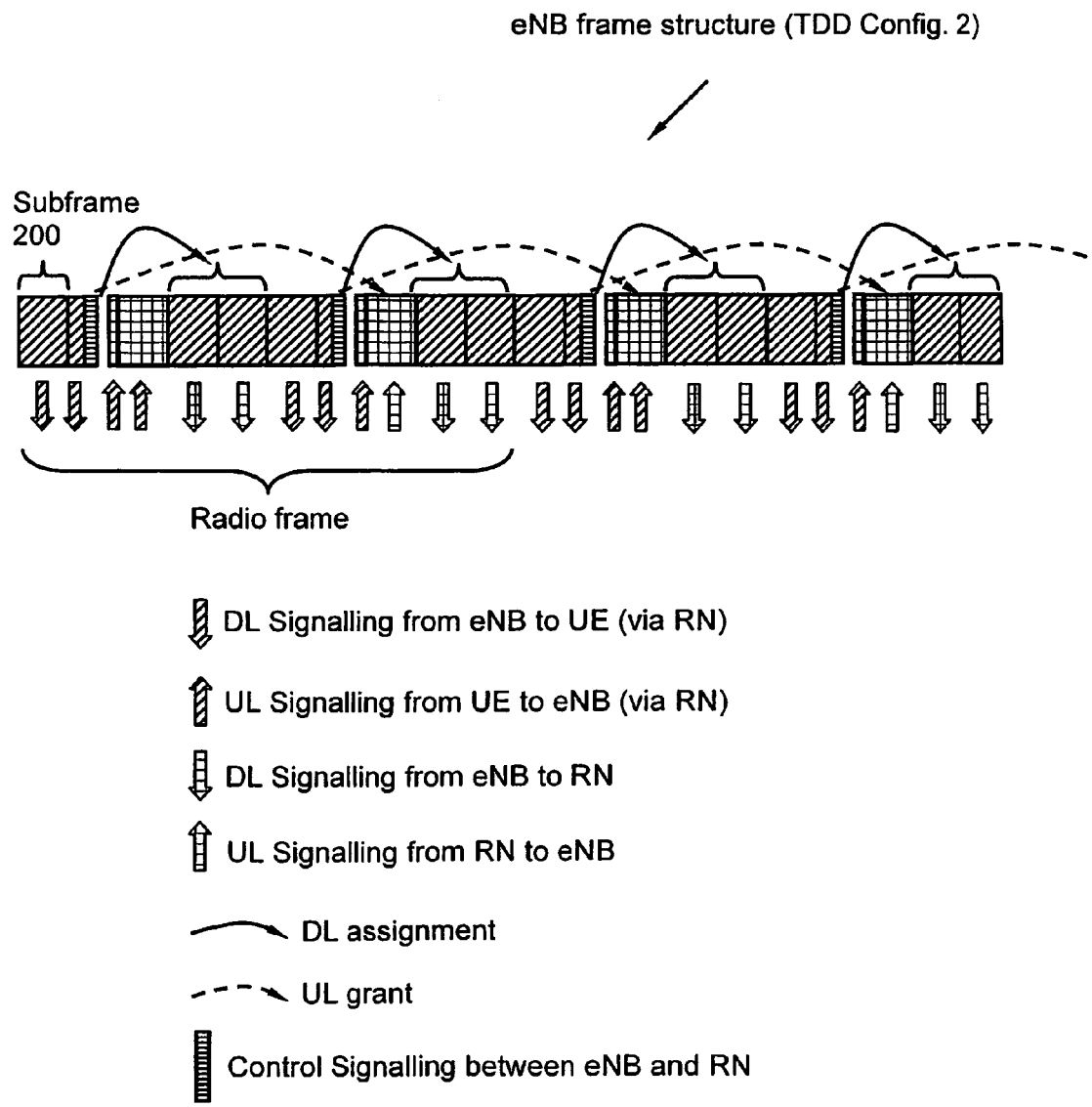
FIG. 9 is a schematic block diagram illustrating downlink assignment and uplink grant, one control to more than one subframe.

FIG. 9 is a schematic block diagram illustrating downlink assignment and uplink grant, one control to more than one subframe, according to some embodiments.

As control signalling from the base station 110 to the relay node 120 may span the entire bandwidth, Uu control signalling in Rel-8 can be used on Un. Uu is in the present context used for denominating the interface between the base station 110 and the user equipment 130 while Un is used for denominating the interface between the base station 110 and the relay node 120, as already mentioned. Such control signalling may comprise e.g. PCFICH, PHICH and/or PDCCH, according to some embodiments.

Reuse PCFICH for Un-PCFICH: this field is used to indicate how many symbols are used for the Un control region. The number of symbols can be e.g. 1, 2 or 3.

Un-PHICH may be used to indicate Hybrid Automatic Repeat Request (HARQ) ACK/NACK for uplink backhaul transmission. According to some embodiments the Un-PHICH may be transmitted in the special subframe 200. A HARQ timing adjustment may be advantageous, according to those embodiments.

Un-PDCCH may have e.g. the same format as PDCCH in LTE Rel-8, according to some embodiments. Different from PDCCH in LTE Rel-8, which usually refers to resources and transmission schemes in the same downlink subframe and which refers to one or more future uplink subframes, Un-PDCCH refers to future Un subframes.

If there are as many relay-Ctrl regions as UL/DL Un subframes, the relay-Ctrl-region may refer to a single UL/DL subframe. Just to mention some brief examples:

The Un-PDCCH uplink grants may be valid for the following uplink Un subframe with a minimum distance of 3TTIs, according to some embodiments.

The Un-PDCCH downlink assignments may be valid for the following downlink Un subframe before the next Un-PDCCH takes effect, according to some embodiments.

If there are less relay-Ctrl regions than UL/DL Un subframes, the relay-Ctrl-region may refer to multiple UL/DL subframe. FIG. 9 shows such an example.

The Un-PDCCH uplink grants may be valid for the following uplink Un subframes with a minimum distance of e.g. 3TTIs and before next uplink grant take effect. An alternative may be to use different DCI to refer to different Un uplink subframe i.e. one DCI to one Un uplink subframe. The uplink index in the DCI format 0 can also be used to represent the subframe number.

The Un-PDCCH downlink assignments may be valid for all following downlink Un subframes before the next Un-PDCCH takes effect.

The configuration of downlink Un subframe and uplink Un subframe may be configured via Radio Resource Control (RRC) in a semi-static manner.

When the Un-PDCCH refers to multiple UL/DL Un subframes, all such UL/DL Un subframes may have the same frequency resource allocation pattern until the new Un PDCCH takes effect.

Figure 10:
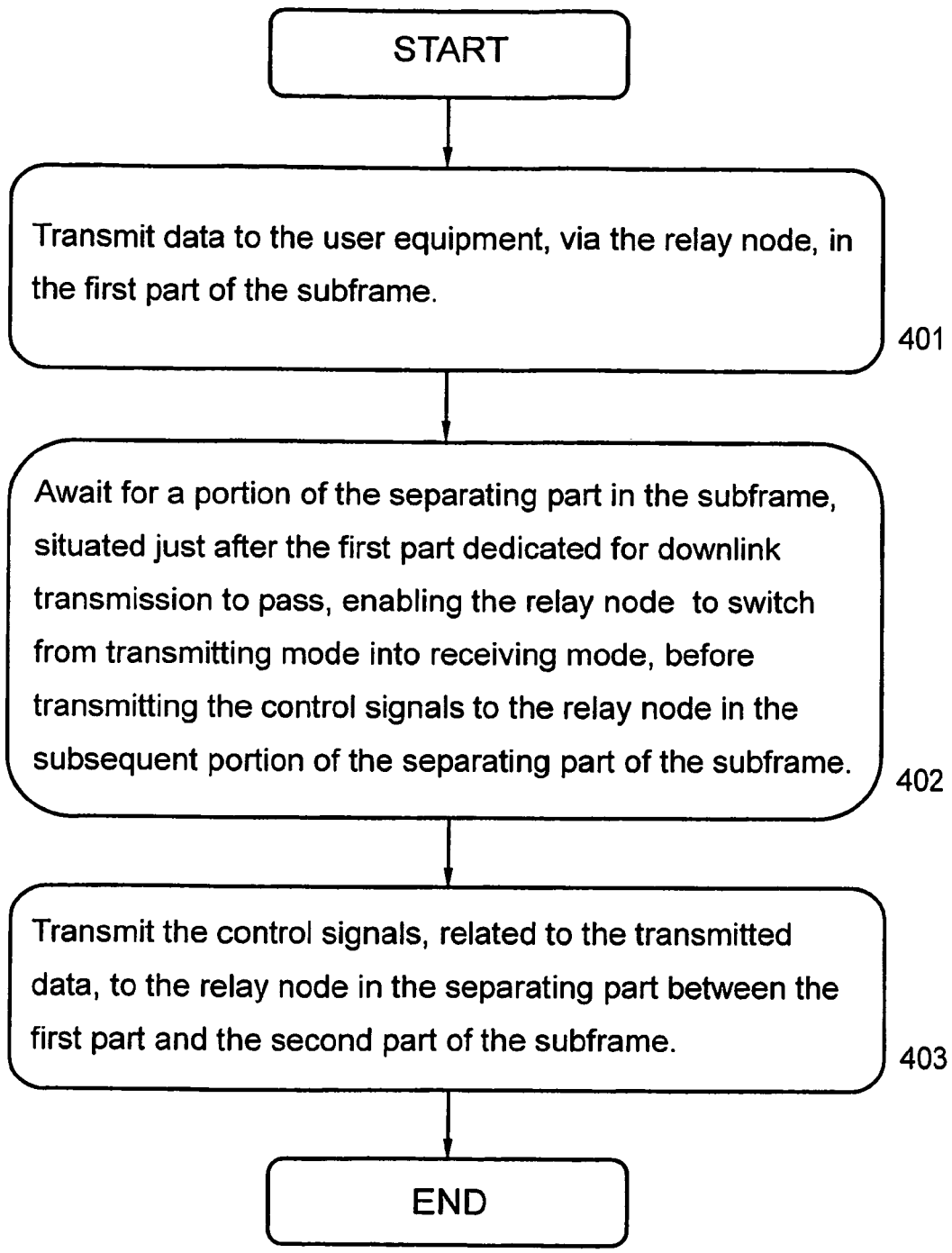
FIG. 10 is a schematic flow chart illustrating embodiments of a method in a base station.

FIG. 10 is a schematic block diagram illustrating a method in a base station 110 for sending control signals to a relay node 120. The relay node 120 is configured to relay a data transmission from the base station 110 to a user equipment 130 in a subframe 200. The subframe 200 comprises a first part 210 dedicated for downlink transmission, a second part 220 dedicated for uplink transmission and a separating part 230 situated between the first part 210 and the second part 220. The base station 110, the relay node 120 and the user equipment 130 are comprised in a wireless communication network 100 configured to operate according to the Time Division Duplex (TDD) principle.

The first part 210 of the subframe 200 may be a downlink pilot timeslot (DwPTS) according to some embodiments. The second part 220 of the subframe 200 may be an uplink pilot timeslot (UpPTS) and the separating part 230 between the first part 210 and the second part 220 of the subframe 200 may be a Guard Period (GP) according to some embodiments.

The base station 110 and the relay node 120 may use the same; or different subframe configurations, according to different embodiments.

The control signals may comprise e.g. downlink Layer 1/Layer 2 (L1/L2) control signals. According to some embodiments the control signals may be transmitted on any of: a Physical Control Format Indicator Channel (PCFICH), a Physical Hybrid ARQ Indicator Channel (PHICH) and/or a Physical Downlink Control Channel (PDCCH).

The control signalling may further optionally comprise an indication of further data transmission on subframes 200 to be transmitted between the base station 110 and the relay node 120, according to some embodiments.

In addition, the further data to be transmitted in the subframe 200 between the base station 110 and the relay node 120 may comprise an acknowledgement/non-acknowledgement of received data (ACK/NACK) according to the Hybrid Automatic Repeat Request (HARQ) protocol.

The method may comprise a number of method steps 401-403, in order to correctly send the control signals to the relay node 120. The method steps may be performed in a somewhat different order. One of the described method steps i.e. step 402 is optional and may be performed within only one or some embodiments.

Step 401

Data is transmitted to the user equipment 130, via the relay node 120, in the first part 210 of the subframe 200.

Step 402

This step is optional and may be performed within only one or some embodiments.

Awaiting for a portion of the separating part 230 in the subframe 200, situated just after the first part 210 dedicated for downlink transmission to pass, enabling the relay node 120 to switch from transmitting mode into receiving mode, before transmitting the control signals to the relay node 120 in the subsequent portion of the separating part 230 of the subframe 200.

Step 403

The control signals, related to the transmitted data are transmitted to the relay node 120 in the separating part 130 between the first part 210 and the second part 220 of the subframe 200.

Figure 11:
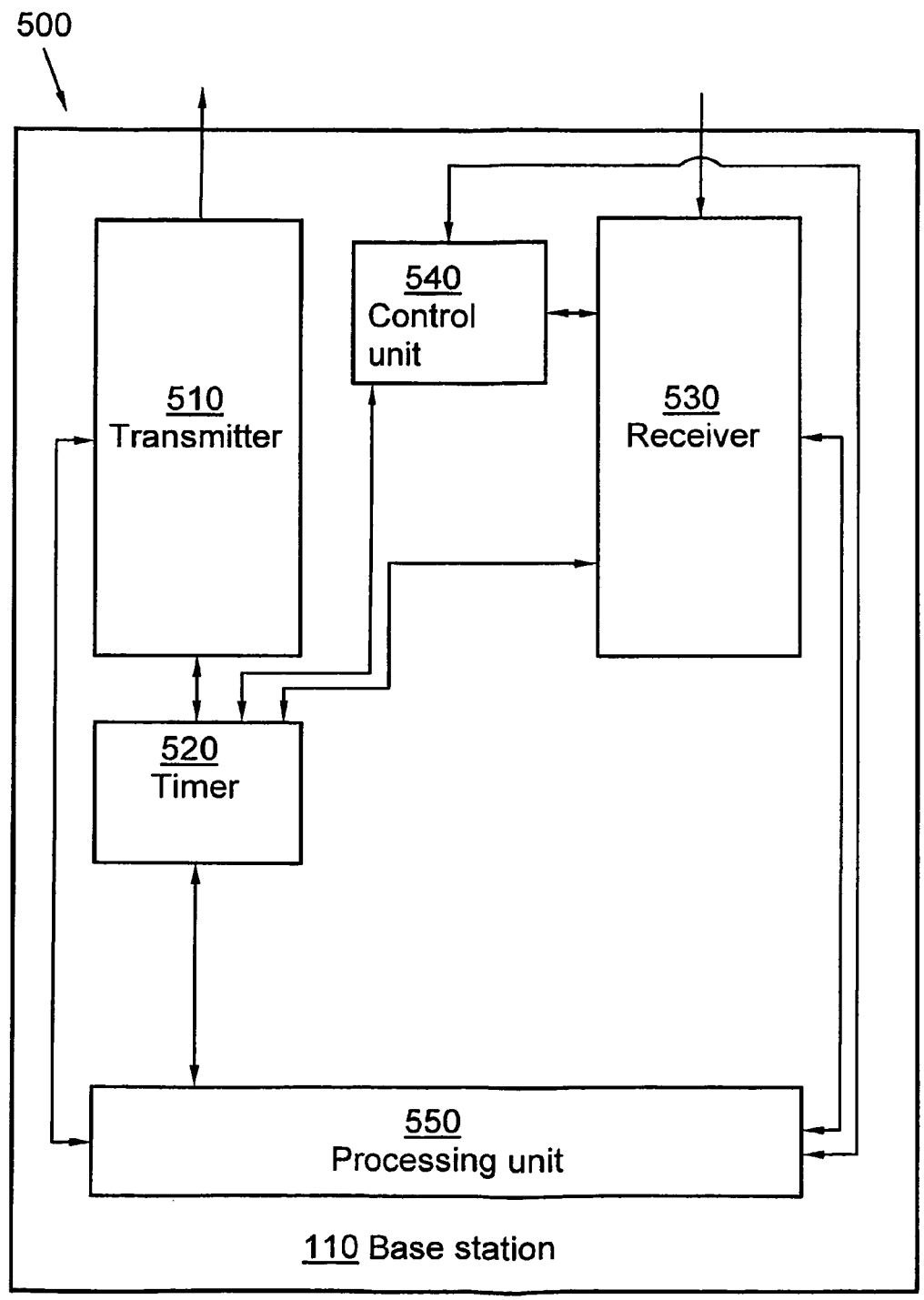
FIG. 11 is a block diagram illustrating embodiments of an arrangement in a base station.

FIG. 11 is a block diagram illustrating embodiments of an arrangement 500 situated in a base station 110. The arrangement 500 is configured to perform the method steps 401-403 for transmitting control signalling to a relay node 120. The relay node 120 is configured to relay a data transmission from the base station 110 to a user equipment 130 in a subframe 200. The subframe 200 comprises a first part 210 dedicated for downlink transmission, a second part 220 dedicated for uplink transmission and a separating part 230 situated between the first part 210 and the second part 220. The base station 110, the relay node 120 and the user equipment 130 are comprised in a wireless communication network 100 configured to operate according to the Time Division Duplex (TDD) principle.

The first part 210 of the subframe 200 may be a downlink pilot timeslot (DwPTS) according to some embodiments. The second part 220 of the subframe 200 may be an uplink pilot timeslot (UpPTS) and the separating part 230 between the first part 210 and the second part 220 of the subframe 200 may be a guard period GP according to some embodiments.

The base station 110 and the relay node 120 may use the same; or different subframe configurations, according to different embodiments.

The control signals may comprise e.g. downlink Layer 1/Layer 2 (L1/L2) control signals. According to some embodiments may the control signals be transmitted on any of: a Physical Control Format Indicator Channel (PCFICH), a Physical Hybrid ARQ Indicator Channel (PHICH) and/or a Physical Downlink Control Channel (PDCCH).

The control signalling may further optionally comprise an indication of further data transmission on subframes 200 to be transmitted between the base station 110 and the relay node 120, according to some embodiments.

In addition, the further data to be transmitted in the subframe 200 between the base station 110 and the relay node 120 may comprise an acknowledgement/non-acknowledgement of received data (ACK/NACK) according to the Hybrid Automatic Repeat Request (HARQ) protocol.

For the sake of clarity, any internal electronics of the arrangement 500, not completely necessary for understanding the present method has been omitted from FIG. 11.

The arrangement 500 comprises a transmitter 510. The transmitter 510 is configured to transmit data to the user equipment 130, via the relay node 120, in the first part 210 of the subframe 200. The transmitter 510 is further configured to transmit the control signals, related to the transmitted data, to the relay node 120 in the separating part 230 between the first part 210 and the second part 220 of the subframe 200.

The arrangement 500 may further optionally comprise, according to some embodiments, a timer 520. The timer 520 may be configured for awaiting for a portion of the separating part 230 in the subframe 200, situated just after the first part 210 dedicated for downlink transmission to pass, enabling the relay node 220 to switch between transmitting and receiving mode, before transmitting the control signals to the relay node 120 in the subsequent portion of the separating part 230 of the subframe 200.

Further yet, the arrangement 500 also may comprise a receiver 530. The receiver 530 is configured to receive signals from the relay node 120 and/or the user equipment 130.

In addition according to some embodiments, the arrangement 500 may furthermore comprise a control unit 540. The control unit 540 is configured to render control signals to be transmitted to the relay node 120.

The arrangement 500 may according to some embodiments comprise a processor 550. The processor 550 may be represented by e.g. a Central Processing Unit (CPU), a processing unit, a microprocessor, or other processing logic that may interpret and execute instructions. The processor 550 may perform all data processing functions for inputting, outputting, and processing of data including data buffering and device control functions, such as call processing control, user interface control, or the like.

It is to be noted that the described units 510-550 comprised within the arrangement 500 may be regarded as separate logical entities, but not with necessity as separate physical entities. Any, some or all of the units 510-550 may be comprised or co-arranged within the same physical unit. However, in order to facilitate the understanding of the functionality of the arrangement 500, the comprised units 510-550 are illustrated as separate physical units in FIG. 11.

Thus the transmitter 510 and e.g. the receiver 540 may, according to some embodiments, be comprised within one physical unit, a transceiver, which may comprise a transmitter circuit and a receiver circuit, which respectively transmits outgoing radio frequency signals to the relay node 120 and receives incoming radio frequency signals from the relay node 120 and/or the user equipment 130 via an optional antenna. The antenna may be an embedded antenna, a retractable antenna or any other arbitrary antenna without departing from the scope of the present arrangements. The radio frequency signals transmitted between the base station 110 and the relay node 120 and/or the user equipment 130 may comprise both traffic and control signals e.g. paging signals/messages for incoming calls, which may be used to establish and maintain a voice call communication with another party or to transmit and/or receive data, such as SMS, e-mail or MMS messages.

The method steps 401-403 in the base station 110 may be implemented through one or more processors 550 in the base station 110, together with computer program code for performing the functions of the present method steps 401-403. Thus a computer program product, comprising instructions for performing the method steps 401-403 in the base station 110 may perform a method for transmitting control signals in a guard period 230 to the relay node 120.

The computer program product mentioned above may be provided for instance in the form of a data carrier carrying computer program code for performing the method steps 401-403 according to the present solution when being loaded into the processor 550. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the base station 110 remotely, e.g. over an Internet or an intranet connection.

Figure 12:
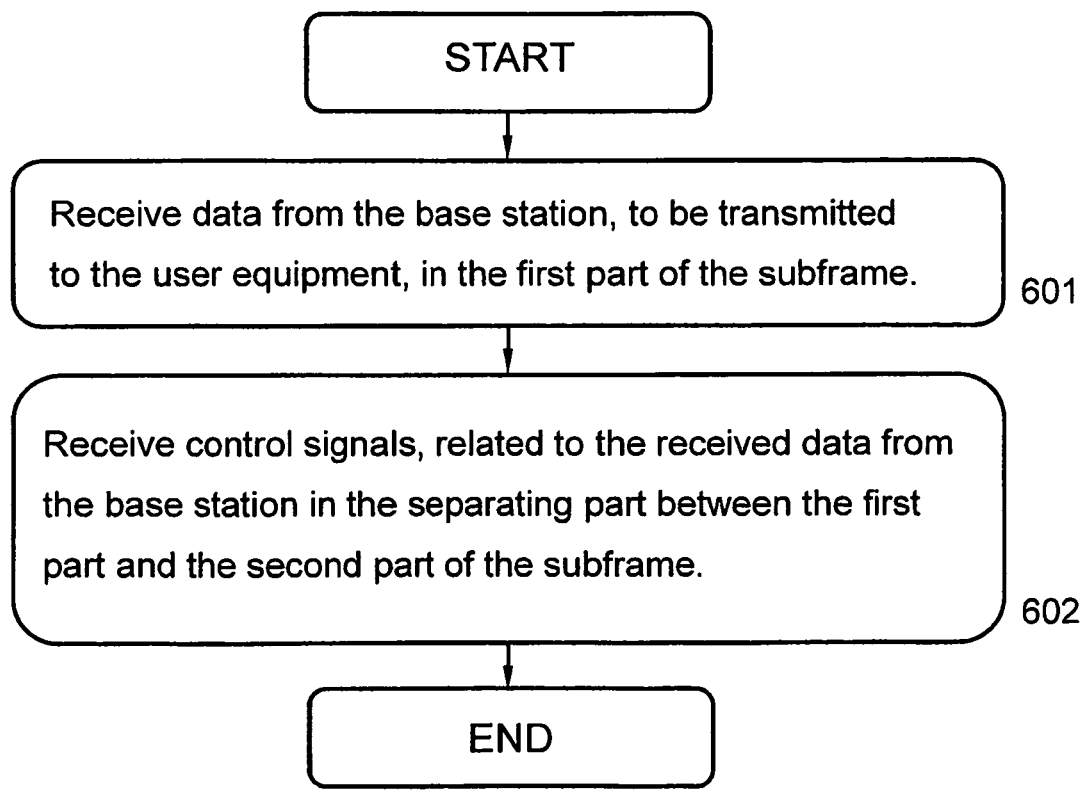
FIG. 12 is a schematic flow chart illustrating embodiments of a method in a relay node.

FIG. 12 is a flow chart illustrating embodiments of method steps 601-602 performed in a relay node 120. The method aims at receiving control signalling from a base station 110.

The relay node 120 is configured to relay a data transmission from the base station 110 to a user equipment 130 in a subframe 200. The subframe 200 comprises a first part 210 dedicated for downlink transmission, a second part 220 dedicated for uplink transmission and a separating part 230 situated between the first part 210 and the second part 220. The base station 110, the relay node 120 and the user equipment 130 are comprised in a wireless communication network 100 configured to operate according to the Time Division Duplex (TDD) principle.

To appropriately receive control signalling from the base station 110, the method may comprise a number of method steps 601-602. Further, it is to be noted that the method steps 601-602 may be performed in any arbitrary chronological order and that some of them, e.g. step 601 and step 602, or even all steps 601-602 may be performed simultaneously or in an altered, arbitrarily rearranged, decomposed or even completely reversed chronological order, according to different embodiments. The method may comprise the following steps:

Step 601

Data to be transmitted to the user equipment 130 is received from the base station 110, in the first part 210 of the subframe 200.

Step 602

Control signals, related to the received data from the base station 110 are received in the separating part 230 between the first part 210 and the second part 220 of the subframe 200.

Figure 13:
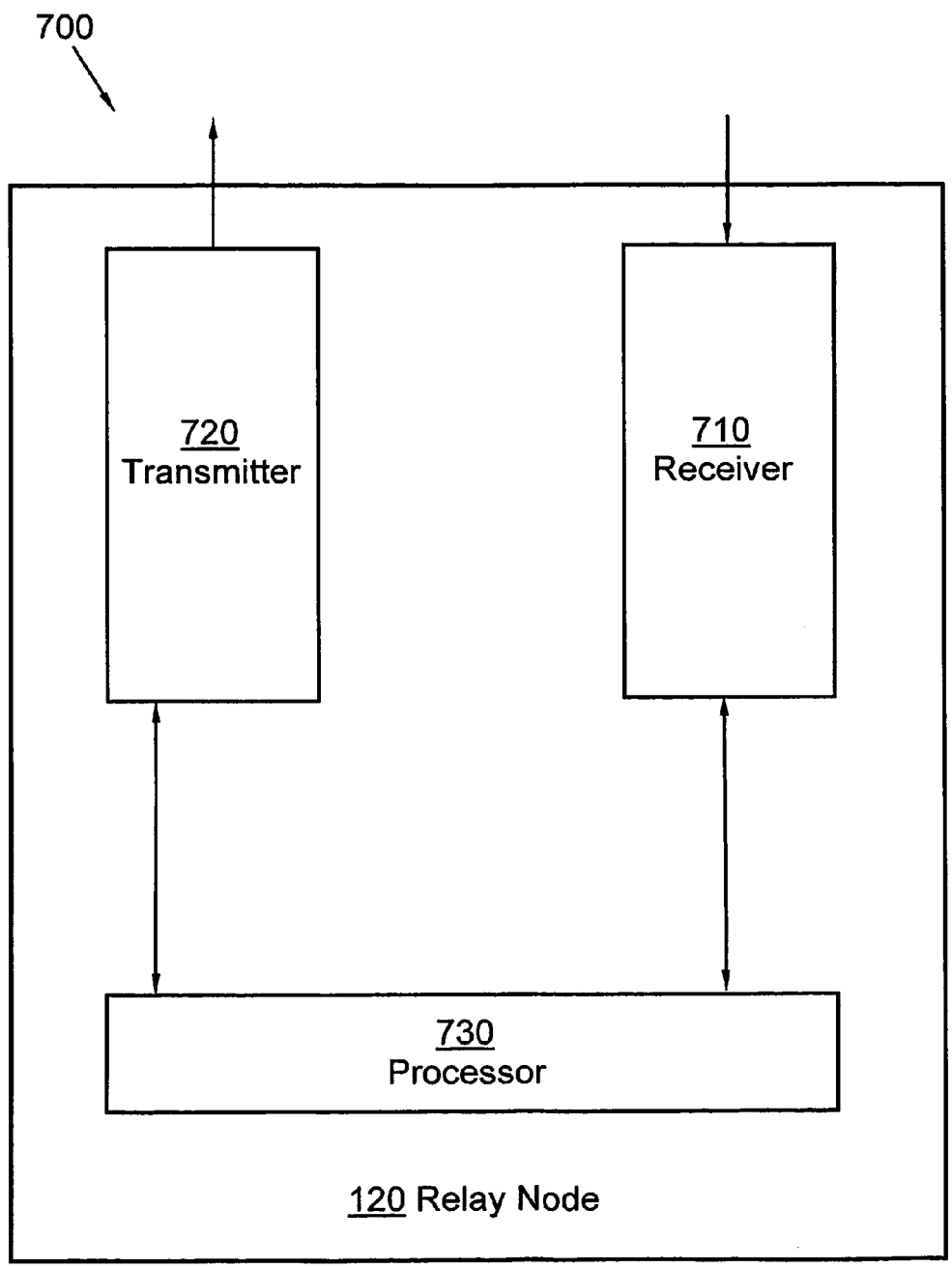
FIG. 13 is a block diagram illustrating embodiments of an arrangement in a relay node.

FIG. 13 is a block diagram illustrating embodiments of an arrangement 700 situated in a relay node 120. The arrangement 700 is configured to perform the method steps 601-602 for receiving control signalling from the base station 110.

The relay node 120 is configured to relay a data transmission from the base station 110 to a user equipment 130 in a subframe 200. The subframe 200 comprises a first part 210 dedicated for downlink transmission, a second part 220 dedicated for uplink transmission and a separating part 230 situated between the first part 210 and the second part 220. The base station 110, the relay node 120 and the user equipment 130 are comprised in a wireless communication network 100 configured to operate according to the Time Division Duplex (TDD) principle.

For the sake of clarity, any internal electronics of the arrangement 700, not completely necessary for understanding the present method has been omitted from FIG. 13.

The arrangement 700 comprises a receiver 710. The receiver 710 is configured for receiving data from the base station 110, to be transmitted to the user equipment 130, in the first part 210 of the subframe 200, and for receiving control signals, related to the received data from the base station 110 in the separating part 230 between the first part 210 and the second part 220 of the subframe 200.

Also, the arrangement 700 may optionally comprise a transmitting unit 720, according to some embodiments.

The arrangement 700 may according to some embodiments comprise a processor 730. The processor 730 may be represented by e.g. a CPU, a processor, a microprocessor, or other processing logic that may interpret and execute instructions. The processor 730 may perform any, all, or at least some data processing functions for inputting, outputting, and processing of data including data buffering and device control functions, such as call processing control, user interface control, or the like.

It is to be noted that the described units 710-730 comprised within the arrangement 700 may be regarded as separate logical entities, but not with necessity as separate physical entities. Any, some or all of the units 710-730 may be comprised or co-arranged within the same physical unit. However, in order to facilitate the understanding of the functionality of the arrangement 700, the comprised units 710-730 are illustrated as separate physical units in FIG. 13.

Thus the receiving unit 710 and e.g. the transmitting unit 720 may, according to some embodiments, be comprised within one physical unit, a transceiver, which may comprise a transmitter circuit and a receiver circuit, which respectively transmits outgoing radio frequency signals to the base station 110 and receives incoming radio frequency signals from the base station 110 via an optional antenna. The antenna may be an embedded antenna, a retractable antenna or any other arbitrary antenna without departing from the scope of the present arrangements. The radio frequency signals transmitted between the base station 110 and the relay node 120 may comprise both traffic and control signals e.g. paging signals/messages for incoming calls, which may be used to establish and maintain a voice call communication with another party or to transmit and/or receive data, such as SMS, e-mail or MMS messages.

The described method steps 601-602 in the relay node 120 may be implemented through one or more processors 730 in the relay node 120, together with computer program code for performing the functions of the present method steps 601-602. Thus a computer program product, comprising instructions for performing the method steps 601-602 in the relay node 120 may receive control signalling from the base station 110.

The computer program product mentioned above may be provided for instance in the form of a data carrier carrying computer program code for performing the method steps according to the present solution when being loaded into the processor 730. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the relay node 120 remotely, e.g. over an Internet or an intranet connection.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a base station for sending control signals to a relay node, wherein the relay node is configured to relay a data transmission from the base station to a user equipment in a subframe, which subframe comprises a first part dedicated for downlink transmission, a second part dedicated for uplink transmission and a separating part situated between the first part and the second part, wherein the base station, the relay node and the user equipment are configured to operate according to the Time Division Duplex "TDD" principle, and wherein the method comprises:
   transmitting data to the user equipment, via the relay node, in the first part of the subframe;
   transmitting the control signals, related to the transmitted data, to the relay node in the separating part between the first part and the second part of the subframe.

2. The method according to claim 1, wherein the control signals are downlink Layer 1/Layer 2 (L1/L2) control signals.

3. The method according to claim 1, wherein the control signals are transmitted on any of: a Physical Control Format Indicator Channel (PCFICH), a Physical Hybrid ARQ Indicator Channel (PHICH) and/or a Physical Downlink Control Channel (PDCCH).

4. The method according to claim 1, wherein the base station and the relay node use the same subframe configuration and wherein the method further comprises:
   awaiting for a portion of the separating part in the subframe, situated just after the first part dedicated for downlink transmission, to pass, enabling the relay node to switch from transmitting mode into receiving mode, before transmitting the control signals to the relay node in the subsequent portion of the separating part of the subframe.

5. The method according to claim 1, wherein the base station and the relay node use the different subframe configurations.

6. The method according to claim 1, wherein the first part of the subframe is a downlink pilot timeslot (DwPTS), the second part of the subframe is an uplink pilot timeslot (UpPTS) and the separating part between the first part and the second part of the subframe is a guard period (GP).

7. The method according to claim 1, wherein the control signaling comprises an indication of further data transmission on subframes to be transmitted between the base station and the relay node.

8. The method according to claim 7, wherein the further data to be transmitted in the subframe between the base station and the relay node comprises an acknowledgement/non-acknowledgement of received data (ACK/NACK) according to the Hybrid Automatic Repeat Request (HARQ) protocol.

9. The method according to claim 1, wherein the separating part is directly between the first part and the second part of the subframe.

10. An arrangement in a base station for sending control signals to a relay node, wherein the relay node is configured to relay a data transmission from the base station to a user equipment in a subframe, which subframe comprises a first part, dedicated for downlink transmission, a second part dedicated for uplink transmission and a separating part situated directly between the first part and the second part, and further wherein the base station, the relay node and the user equipment are configured to operate according to the Time Division Duplex "TDD" principle, and the arrangement comprises:
    a transmitter, configured to transmit data to the user equipment, via the relay node, in the first part of the subframe, and further configured to transmit the control signals, related to the transmitted data, to the relay node in the separating part between the first part and the second part of the subframe.

11. The arrangement according to claim 10, further comprising;
    a timer, configured for awaiting for a portion of the separating part in the subframe, situated just after the first part dedicated for downlink transmission, to pass, enabling the relay node to switch between transmitting and receiving mode, before transmitting the control signals to the relay node in the subsequent portion of the separating part of the subframe.

12. The arrangement according to claim 10, wherein the separating part is directly between the first part and the second part of the subframe.

13. A method in a relay node for receiving control signals from a base station, wherein the relay node is configured to relay a data transmission from the base station to a user equipment in a subframe, which subframe comprises a first part dedicated for downlink transmission, a second part dedicated for uplink transmission and a separating part situated between the first part and the second part, and further wherein the base station, the relay node and the user equipment are configured to operate according to the Time Division Duplex "TDD" principle, and the method comprises:
    receiving data from the base station, to be transmitted to the user equipment, in the first part of the subframe;
    receiving control signals, related to the received data from the base station in the separating part between the first part and the second part of the subframe.

14. An arrangement in a relay node for receiving control signals from a base station, wherein the relay node is configured to relay a data transmission from the base station to a user equipment in a subframe, which subframe comprises a first part dedicated for downlink transmission, a second part dedicated for uplink transmission and a separating part situated between the first part and the second part, the base station, and further wherein the relay node and the user equipment are configured to operate according to the Time Division Duplex "TDD" principle, and the arrangement comprises:
    a receiver configured for receiving data from the base station, to be transmitted to the user equipment, in the first part of the subframe, and for receiving control signals, related to the received data from the base station in the separating part between the first part and the second part of the subframe.

\* \* \* \* \*